(12) United States Patent
Sarrigeorgidis et al.

(10) Patent No.: US 9,525,453 B2
(45) Date of Patent: Dec. 20, 2016

(54) INTERMODULATION CANCELLATION OF THIRD-ORDER DISTORTION IN AN FDD RECEIVER

(71) Applicant: Apple Inc., Cupertino, CA (US)

(72) Inventors: Konstantinos Sarrigeorgidis, Sunnyvale, CA (US); Tarik Tabet, Los Gatos, CA (US); Syed A Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 14/300,290

(22) Filed: Jun. 10, 2014

(65) Prior Publication Data

US 2015/0358047 A1    Dec. 10, 2015

(51) Int. Cl.
*H04L 27/00* (2006.01)
*H04B 1/54* (2006.01)
*H04B 1/12* (2006.01)

(52) U.S. Cl.
CPC . *H04B 1/54* (2013.01); *H04B 1/12* (2013.01)

(58) Field of Classification Search
CPC ............ H04B 17/21; H04B 1/10; H04B 1/525
USPC ........................................................ 375/285
See application file for complete search history.

(56) References Cited

U.S. PATENT DOCUMENTS

| | | | |
|---|---|---|---|
| 3,898,573 A * | 8/1975 | Sherman | H03H 11/0405 327/311 |
| 5,638,439 A * | 6/1997 | Kawada | H04B 3/23 370/290 |
| 8,432,836 B2 | 4/2013 | Sanguinetti | |
| 2007/0184782 A1* | 8/2007 | Sahota | H04B 1/525 455/63.1 |
| 2010/0041353 A1* | 2/2010 | Alford | H04B 17/101 455/115.1 |
| 2010/0048146 A1 | 2/2010 | McCallister | |
| 2010/0159837 A1 | 6/2010 | Dent et al. | |
| 2013/0044791 A1 | 2/2013 | Rimini et al. | |

FOREIGN PATENT DOCUMENTS

| | | |
|---|---|---|
| JP | 2008265223 | 11/2008 |
| JP | 2009526442 | 7/2009 |
| JP | 2010500831 | 1/2010 |

* cited by examiner

*Primary Examiner* — David S Huang
(74) *Attorney, Agent, or Firm* — Meyertons Hood Kivlin Kowert & Goetzel, P.C.; Jeffrey C. Hood

(57) ABSTRACT

A transceiver device may include a transmit path that generates a modulated transmit signal based on a baseband signal, and a receive path that receives a receive signal, which is subject to third-order order distortion caused by intermodulation noise resulting from a continuous wave blocker intermodulating with transmit leakage from the transmit path. The transceiver may also include a compensation path that models portions of the transmit path and the receive path, and generates a replica signal representative of the third-order order distortion according to at least a specified function and the modeled portions of the transmit path and the receive path. The compensation path also filters the replica signal and subtracts the filtered replica signal from the receive signal to eliminate the third-order order distortion caused by the intermodulation noise. The filtering of the replica signal may be performed by programmable finite impulse response filters.

20 Claims, 10 Drawing Sheets

INTERMODULATION CANCELLATION OF THIRD-ORDER DISTORTION IN AN FDD RECEIVER

FIELD OF THE INVENTION

The present application relates to wireless devices, and more particularly to a system and method for cancelling third-order intermodulation distortion in receivers.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication. In particular, it is important to ensure the accuracy of transmitted and received signals through user equipment (UE) devices, e.g., a wireless device such as a cellular phone, as well as base stations and relay stations used in wireless cellular communications. In addition, the large amount of functionality present in a UE device can place a significant strain on the battery life of the UE device. Thus it is very important to also reduce power requirements in UE device designs while allowing the UE device to maintain good transmit and receive abilities for improved communications.

The power consumption of an RF (radio frequency) transceiver—included in UE devices, base stations and relay station, for example—is typically a function of the signal fidelity presented at the input of an ADC present in the receive (RX) path. The receiver is typically designed to optimize the noise figure (requiring more power) at sensitivity levels, in which case linearity is not important. At high signal levels, the receiver is typically operated to optimize the linearity (requiring more power), in which case the noise figure can be relaxed. In a worst-case scenario, the two design requirements (noise figure and linearity) are expected to be handled simultaneously. This is the case in FDD (frequency division duplex) transceivers where a small signal (close to sensitivity) is received in the presence of two blockers. In LTE (Long Term Evolution) systems, the first blocker is the transmit (TX) leakage and the second blocker is a continuous wave (CW) blocker. This scenario could impose strict linearity requirements at a low noise amplifier (LNA) present in the RX path, and especially at the mixer present in the RX path, since due to the small signal, the LNA is expected to provide sufficient gain to keep the degradation of the RX signal due to the blocker noise figure to a minimum. That is, the LNA is expected to keep the blocker noise figure degradation to a minimum.

Therefore, it would be desirable to provide improved performance and power consumption in wireless communication systems by efficiently canceling intermodulation distortion in LTE, more specifically to efficiently cancel third-order intermodulation distortion (IM3) in LTE signal transmission.

SUMMARY OF THE INVENTION

Various embodiments disclosed herein tradeoff the complexity of designing a highly linear receiver (while maintaining the best noise figure) with a means of canceling the third-order intermodulation distortion (IM3) products in the digital domain. The basic building blocks of an IM3 cancellation circuit/system may include programmable finite impulse response (FIR) filters. Since digital signal processing scales well with technology, this approach benefits from the perspective of power consumption by removing at least the design burden of a highly linear receiver. Current systems and methods address the problem of second-order intermodulation noise (IM2) cancellation. However, the second order input intercept point (IIP2) can be improved with calibration steps and careful design, and achieving a high IIP2 therefore doesn't necessarily incur high power consumption. Embodiments of a novel IM3 cancellation system and method disclosed herein differ from the current state of the art in at least that the IM3 is removed in the digital domain.

Accordingly, embodiments described herein relate to a nonlinear receiver operating at optimum receiver sensitivity level by performing IM3 (third-order intermodulation) distortion cancelation in the digital domain. The distortion cancelation improves the receiver linearity during operation when a very low power desired signal is demodulated in the presence of two strong blockers, specifically, when transmission leakage is intermodulated with a continuous wave (CW) blocker resulting in a corresponding distortion band. Various portions of the transceiver paths, i.e. the transmit (TX) path, and the receive (RX) path to the ADCs (analog to digital converters) in the RX path may be modeled by programmable filter components. Making use of the programmable filter components and an error generating function duplicating the third-order order intermodulation error, a replica signal representative of the third-order order intermodulation error may be generated through a secondary path. The replica error signal may subsequently be filtered and used to cancel the intermodulation noise from the received signal.

In one set of embodiments, a transmit equalizer is used to compensate for the frequency selectivity introduced by the digital TX filter, analog TX filters, and duplexer transmit filter (TF). A receive equalizer is used to compensate for the frequency selectivity introduced by the digital RX filter and analog RX filters. The frequency selectivity may be identified by calibration methods. A FIR (finite impulse response) filter is used to accommodate for any time varying analog transfer function characteristics. A function IM3(I,Q) is used to provide a replica signal representative of a 3rd order distortion signal, with the coefficients of the filter determined by either batch processing based on signal statistics, and/or LMS (least mean squares) adaptation.

A transceiver device may therefore be designed to include a transmit path that generates a modulated transmit signal based on a baseband signal, and a receive path that receives a receive signal, which is subject to third-order distortion caused by intermodulation noise resulting from a continuous wave blocker intermodulating with transmit leakage from the transmit path. The transceiver may further include a compensation path, which models portions of the transmit path and the receive path, generates a replica signal representative of the third-order distortion according to at least a specified function and the modeled portions of the transmit path and the receive path, and filters the replica signal and subtracts the filtered replica signal from the receive signal to eliminate the third-order distortion caused by the intermodulation noise.

The compensation path may be constructed of programmable components that model specified portions of the transmit path and the receive path. In addition, finite impulse response filters in the compensation path may be used to filter the replica signal. The coefficients of the finite impulse response filters may be determined by batch processing based on signal statistics, and/or least mean square adaptation. Furthermore, the finite impulse response filters may be used to accommodate for any time varying analog transfer characteristics. In at least one embodiments, the compensation path includes a transmit equalizer to compensate for frequency selectivity introduced in the transmit path by digital transmit filters, analog transmit filters, and a duplexer transmit function. The compensation path may also include a receive equalizer to compensate for frequency selectivity introduced in the receive path by one or more digital receive filters and one or more analog receive filters. The frequency selectivity introduced in the transmit path and the frequency selectivity introduced in the receive path may both be identified through calibration methods.

In one set of embodiments, various communication devices (such as mobile devices, relay stations or base stations, for example) that transmit and receive radio frequency (RF) signals may include a non-volatile memory device that stores instructions executable by a processing device to cause the communication device to receive an RF signal, derive a baseband signal from the received RF signal, with the derived baseband signal affected by third-order distortion caused by intermodulation noise resulting from a continuous wave blocker intermodulating with transmit leakage. The instructions, when executed, may further cause the communication device to generate a replica signal representative of the third-order distortion according to at least a specified function and models of specific transceiver components of the communication device, and also cause the communication device to filter the replica signal and subtract the filtered replica signal from the derived baseband signal to eliminate the third-order distortion caused by the intermodulation noise.

The instructions may be further executable to cause the communication device to compensate for frequency selectivity introduced in at least a portion of the transceiver components of the mobile device. The replica signal may be correlated with the third-order distortion affecting the derived baseband signal, and uncorrelated with a desired portion of the derived baseband signal. In addition, the instructions may be further executable to cause the communication device to attempt to remove from the derived baseband signal a portion of the derived baseband signal that is estimated from the replica signal.

This Summary is provided for purposes of summarizing some exemplary embodiments to provide a basic understanding of aspects of the subject matter described herein. Accordingly, the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
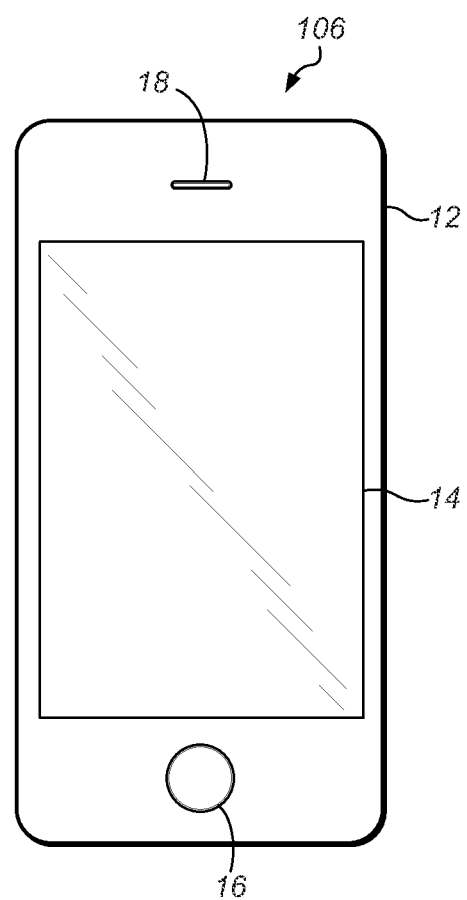
FIG. 1 illustrates an example user equipment (UE) according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present disclosure.

LTE: Long Term Evolution
RAT: Radio Access Technology
TX: Transmit
RX: Receive
RF: Radio Frequency
UL: Uplink
DL: Downlink
CW: Continuous Wave
IM3: Third-Order Intermodulation Distortion
IIP3: Third-Order Input Intercept Point Terms The following is a glossary of terms used in the present application:

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—User Equipment

FIG. 1 illustrates one embodiment of a user equipment (UE) 106. The term UE (or UE device) 106 may be any of various devices as defined above. UE device 106 may include a housing 12 which may be constructed from any of various materials. UE 106 may have a display 14, which may be a touch screen that incorporates capacitive touch electrodes. Display 14 may be based on any of various display technologies. The housing 12 of the UE 106 may contain or comprise openings for any of various elements, such as home button 16, speaker port 18, and other elements (not shown), such as microphone, data port, and possibly various other types of buttons, e.g., volume buttons, ringer button, etc.

The UE 106 may comprise one or more antennas. The UE 106 may also comprise any of various radio configurations, such as various combinations of one or more transmitter chains (TX chains) and one or more receiver chains (RX chains). For example, the UE 106 may comprise a radio that supports two or more RATs. The radio may comprise a single TX (transmit) chain and a single RX (receive) chain. Alternatively, the radio may comprise a single TX chain and two RX chains that operate on the same frequency. In another embodiment, the UE 106 comprises two or more radios, i.e., two or more TX/RX chains (two or more TX chains and two or more RX chains).

In the embodiments described herein, the UE 106 comprises a nonlinear receiver operating at optimum receiver sensitivity level by performing third-order intermodulation distortion cancelation in the digital domain. The distortion cancelation improves the receiver linearity during operation when a very low-power desired signal is demodulated in the presence of two strong blockers, specifically, when transmission leakage is intermodulated with a continuous wave blocker. Various portions of a transmit path and a receive path to the analog to digital converters in the receive path may be modeled by programmable components. The programmable components and an error function duplicating the third-order order intermodulation error may be used to generate, through a compensation path, a replica signal representative of the third-order intermodulation error. The replica error signal may be filtered and used to cancel the intermodulation noise from the received baseband signal.

Figure 2:
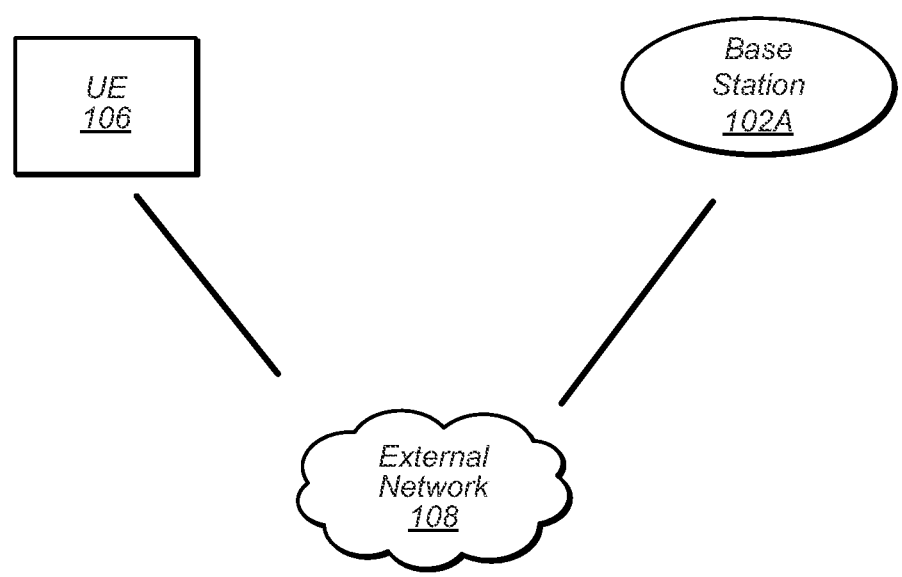
FIG. 2 illustrates an example wireless communication system where a UE communicates with a base station.

FIG. 2—Communication System

FIG. 2 illustrates an exemplary (and simplified) wireless communication system. It is noted that the system of FIG. 2 is merely one example of a possible system, and embodiments may be implemented in any of various systems, as desired.

As shown, the exemplary wireless communication system includes UE 106 which communicates through a transmission medium or network to base station 102. The base station 102 may be a base transceiver station (BTS) or cell site, and may include hardware that enables wireless communication with the UE 106. The base station 102 and the UE 106 may be configured to communicate over the transmission medium using any of various radio access technologies ("RATs", also referred to as wireless communication technologies or telecommunication standards), such as GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), etc.

Figure 3:
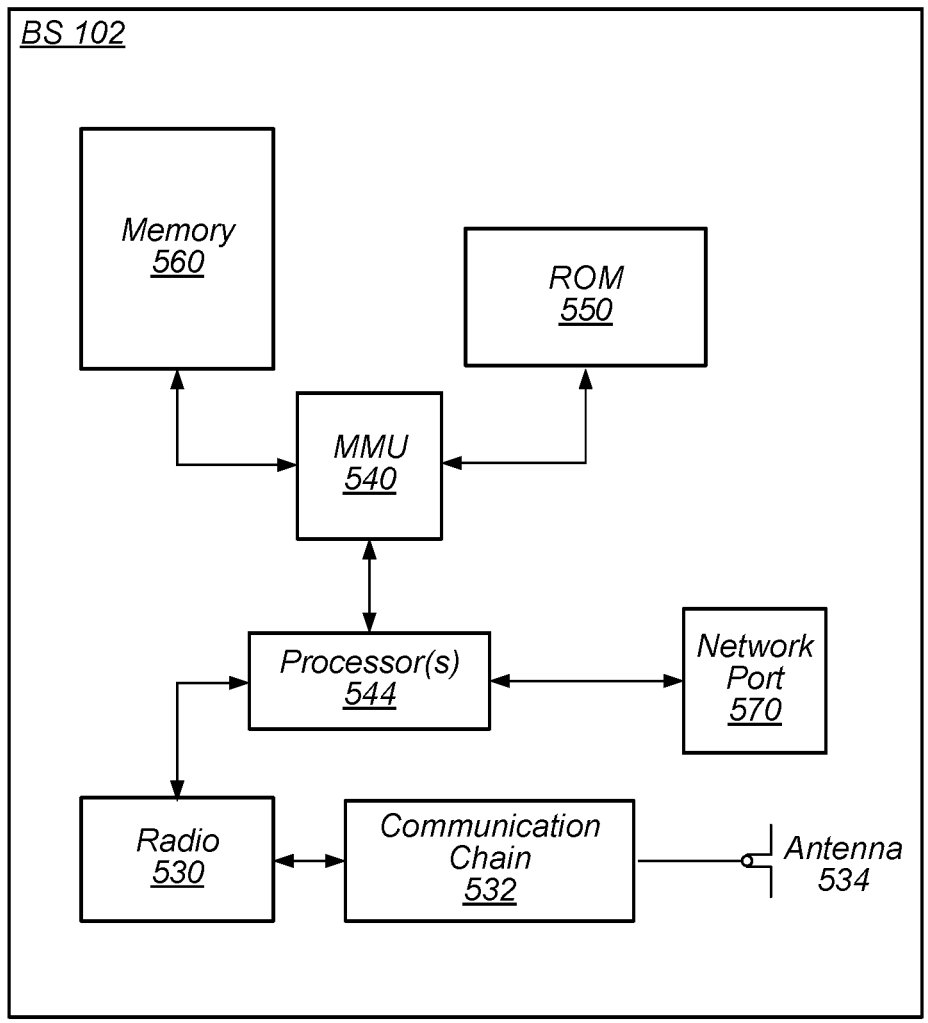
FIG. 3 is an example block diagram of a base station, according to one embodiment.

FIG. 3—Base Station Detail

FIG. 3 illustrates an exemplary block diagram of a base station 102. It is noted that the base station of FIG. 3 is merely one example of a possible base station. As shown, the base station 102 may include processor(s) 544 which may execute program instructions for the base station 102. The processor(s) 544 may also be coupled to memory management unit (MMU) 540, which may be configured to receive addresses from the processor(s) 544 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, LTE, GSM, WCDMA, CDMA2000, etc.

The processor(s) 544 of the base station 102 may be configured to implement part or all of the methods described herein, e.g., by executing program instructions stored on a memory medium (e.g., a non-transitory computer-readable memory medium). Alternatively, the processor(s) 544 may be configured as a programmable hardware element, such as an FPGA (Field Programmable Gate Array), or as an ASIC (Application Specific Integrated Circuit), or a combination thereof.

FIG. 4—UE Detail

Figure 4:
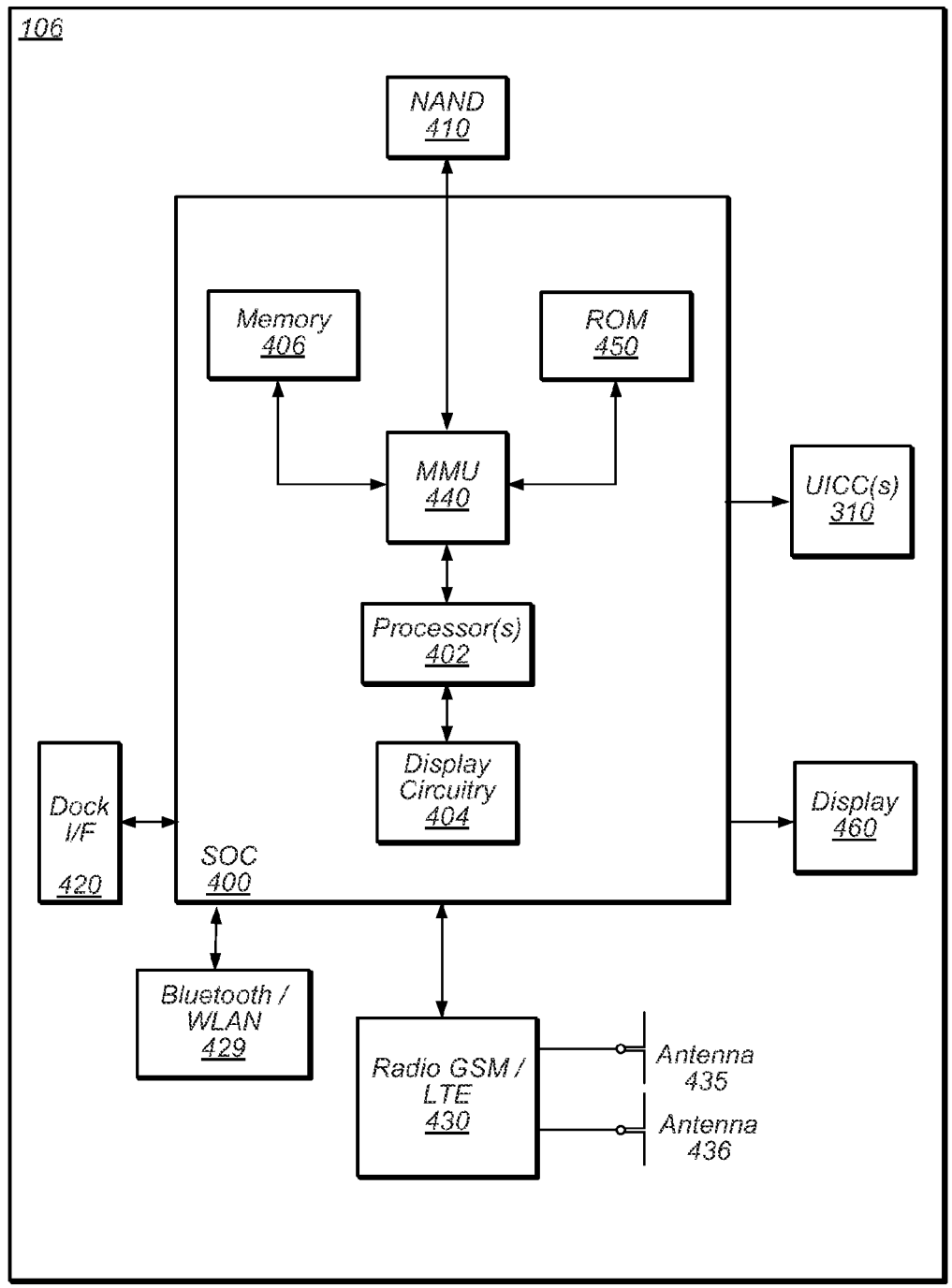
FIG. 4 is an example block diagram of a UE, according to one embodiment.

FIG. 4 illustrates an example simplified block diagram of a UE 106. As shown, the UE 106 may include a system on chip (SOC) 400, which may include portions for various purposes. The SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, cellular communication circuitry 430 such as for LTE, GSM, etc., and short range wireless communication circuitry 429 (e.g., Buletooth and WLAN circuitry). The UE 106 may further comprise one or more smart cards 310 that comprise SIM (Subscriber Identity Module) functionality, such as one or more UICC(s) (Universal Integrated Circuit Card(s)) cards 310. The cellular communication circuitry 430 may couple to one or more antennas, preferably two antennas 435 and 436 as shown. The short range wireless communication circuitry 429 may also couple to one or both of the antennas 435 and 436 (this connectivity is not shown for ease of illustration).

As shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, cellular communication circuitry 430, short range wireless communication circuitry 429, connector I/F 420, and/or display 460. The MMU 440 may be configured to perform memory protection and page table translation or set up. In some embodiments, the MMU 440 may be included as a portion of the processor(s) 402. As noted above, the UE 106 may be designed to implement cancellation of third-order intermodulation noise, as will also be described in further detail below.

As described herein, the UE 106 may include hardware and software components for implementing features for improved communication, such as the third-order intermodulation noise cancellation described herein. The UE 106 may comprise digital logic for performing some or all of the operations related to cancelling the third-order intermodulation noise as described herein. The digital logic may be implemented as discrete digital logic, as a programmable hardware element, such as an FPGA (Field Programmable Gate Array), as an ASIC (Application Specific Integrated Circuit), or as a general-purpose processor, or any combination thereof.

FIGS. 5, 6, 7, and 8—Transceiver System Affected by Third-Order Intermodulation Distortion (IM3)

Figure 5:
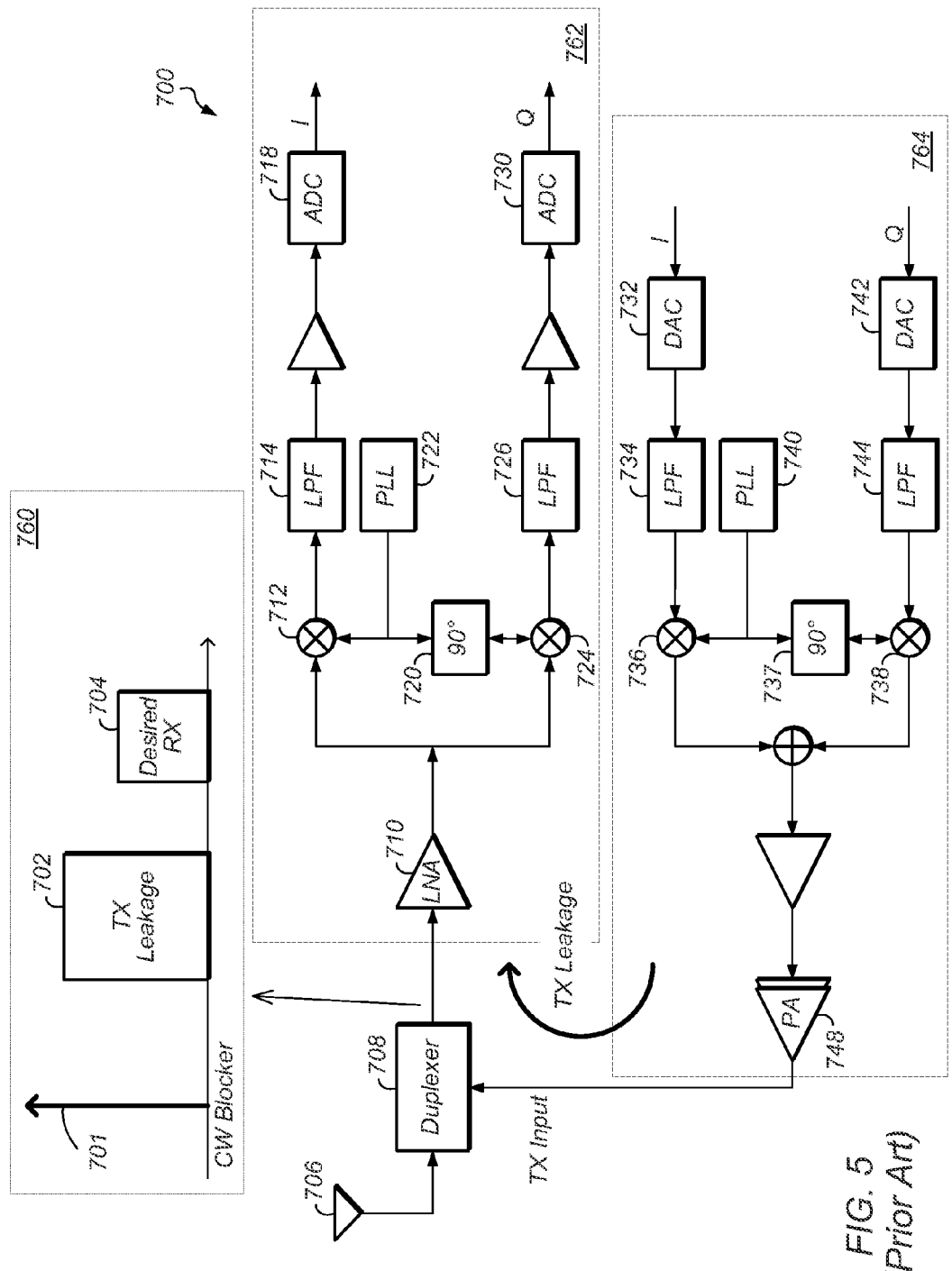
FIG. 5 shows a logic diagram illustrating one embodiment of a direct conversion frequency division duplex transceiver.

FIG. 5 illustrates a transceiver system 700, which may be a portion of UE 106, for example, according to one embodiment. More specifically, FIG. 5 shows the logic/control diagram of a direct conversion frequency division duplex (FDD) transceiver according to prior art. FIG. 5 also shows a simplified frequency diagram 760 illustrating the desired RX signal 704 and continuous wave blocker (CW) signal 701 and TX leakage signal 704, the intermodulation of which results in IM3 in the RX signal received from antenna 706 through duplexer 708 at RX path 762. As shown in FIG. 5, the TX path 764 receives the baseband signal (I and Q components) at digital-to-analog converters (DACs) 732 and 742, respectively. The I and Q signals are low-pass filtered through low-pass filters (LPFs) 734 and 744, respectively, before being modulated through mixers 736 and 738. Phase locked loop (PLL) 740 is used to generate a local oscillator (LO) signal used by the mixers for performing the modulation, with a phase shifter 737 used for performing the quadrature modulation. The modulated RF TX signal is provided to a power amplifier (PA) 748, which sends the amplified TX signal to duplexer 708 for transmission through antenna 706.

The RX path 762 receives an RF RX signal from antenna 706 through duplexer 708. The RF RX signal is provided to a low-noise amplifier (LNA) 710, and the amplified RF RX signal is downmixed through quadrature mixers 712 and 724, which receive an LO signal from PLL 722, with the LO signal phase shifted through shifter 720 for quadrature demodulation. The resulting signals are low-pass filtered through LPFs 714 and 726, respectively, then respectively provided to analog-to-digital converters (ADCs) 718 and 730 to generate baseband signals I and Q. As illustrated in FIG. 5, there is TX leakage from the TX path 764 to RX path 762 (for example, due to the finite isolation of the TX/RX port of duplexer 708). The TX leakage signal may intermodulate with CW blockers present, resulting in IM3 in the RX signal in RX path 762, preventing the transceiver from obtaining a desired, distortion-free RX signal.

Figures 6, 7:
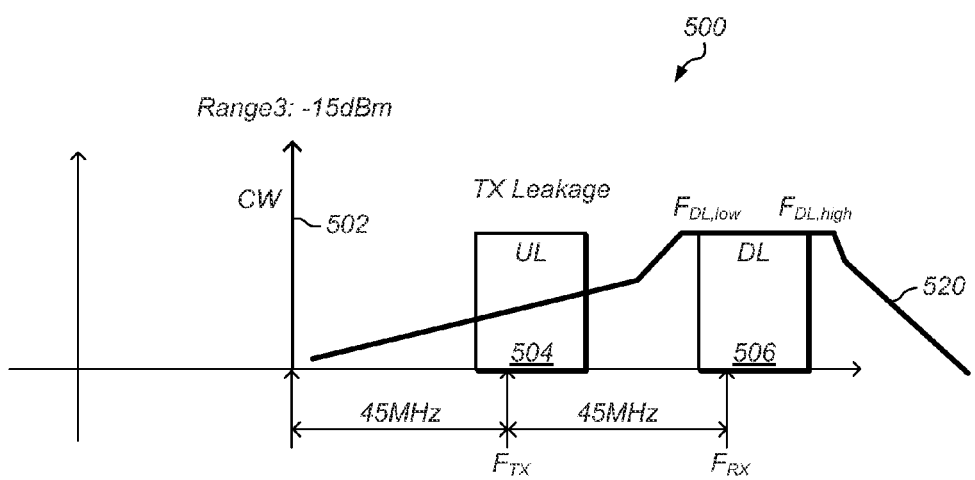
FIG. 6 shows tables representative of the out of band blocking specification provided in the LTE standard.
FIG. 7 shows a frequency diagram illustrating the mechanism of third-order intermodulation distortion resulting from the intermodulation of transmit leakage with a continuous wave blocker.
Figure 8:
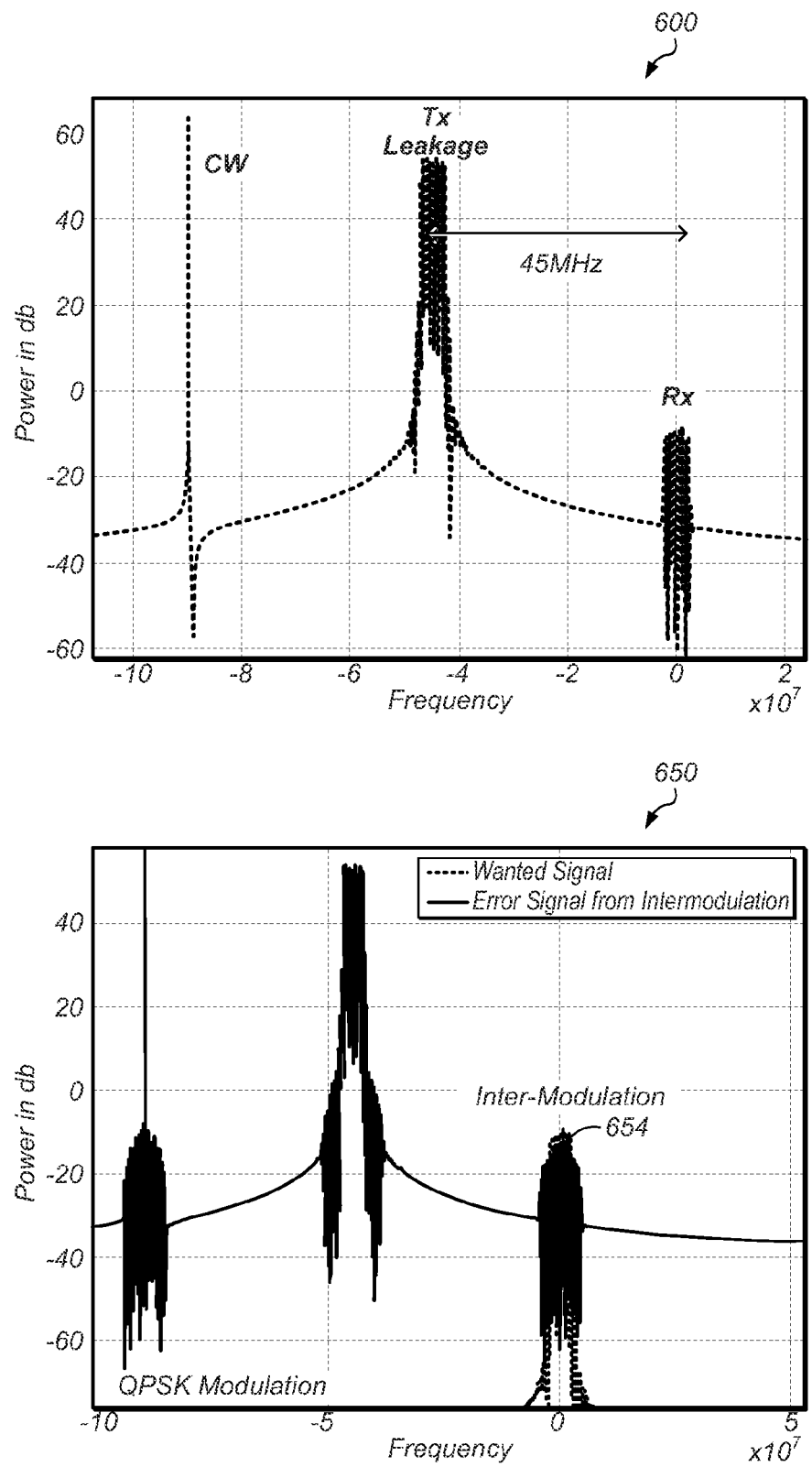
FIG. 8 shows frequency diagrams illustrating the transmit leakage, continuous wave blocker, and receive signal affected by the intermodulation of the transmit leakage with the continuous wave blocker.

The mechanism and effects of IM3 are further illustrated in FIGS. 6, 7 and 8. The LTE standard provides a specification for out of band blocking, summarized at least in part in the tables shown in FIG. 6 for reference. FIG. 7 shows a frequency diagram illustrating the mechanism of third-order intermodulation distortion resulting from the intermodulation of transmit leakage with a continuous wave blocker, providing an example for Band 5 and out of band third-order intercept point (IIP3). Considering Band 5, the duplex separation is 45 MHz. Assuming an interferer at region 3 (referring to Table 7.6.2.1-2 in FIG. 6), the respective frequencies of the TX signal and CW signal may be expressed as $\omega_{tx}=\omega_{rx}-45$ MHz, and $\omega_{cw}=\omega_{rx}-45$ MHz, from which it follows that $2\omega_{tx}-\omega_{cw}=\omega_{rx}$, where $\omega_{tx}$ represents the frequency of the TX signal, $\omega_{rx}$ represents the frequency of the RX signal, and $\omega_{cw}$ represents the frequency of the CW signal. The out of band IIP3 (shown as curve 520) then depends on the duplexer (e.g. duplexer 708) leakage as well as the duplexer out of band filtering. As shown in FIG. 7, CW signal 502 occurs 45 MHz offset with respect to the TX Frequency ($F_{TX}$), which is 45 MHz offset with respect to the RX frequency ($F_{RX}$). The out of band IIP3 is shown with respect to UL band 504 and also with respect to DL band 506.

FIG. 8 provides an illustration of the frequency spectra of various signals, highlighting the adverse effects of IM3 on the desired RX signal. A nonlinear receiver (LNA, Mixer, baseband processing, e.g. as shown in FIG. 5 and described above) is subject to large blockers (TX leakage, and CW blocker). The self generated IM3 products will overwhelm the desired Rx signal as shown in FIG. 8. Diagram 600 illustrates the CW, transmit leakage, and RX signals, while diagram 650 illustrates the effects of the IM3 on the RX signal, whereby during modulation (e.g. during quadrature phase-shift keying modulation), distortion 654 resulting from the intermodulation of the TX leakage with the CW blocker overwhelms the RX signal. It is therefore desirable to cancel this IM3 in order to obtain a clean, accurate RX signal to accurately recover the desired baseband signal(s).

In order to achieve the cancelation of IM3, the various portions and/or elements of the transceiver, e.g. transceiver 700 shown in FIG. 5, may be mathematically modeled in order to obtain a usable signal model. The TX signal may be designated to be:

$$s_{tx}(t)=I_{tx}(t)+jQ_{tx}(t).$$

Let $h_{tx}$, $h_{I,lpf\_tx}$, $h_{Q,lpf\_tx}$, $h_{I,dup}$, $h_{Q,dup}$ denote the baseband equivalent filter impulse responses of the digital transmit filters, analog LPF filters, and the duplexer, respectively. The baseband equivalent model for the TX leakage at the LNA input may then be expressed as:

$$z(t)=\text{Re}[s_{tx}(t)*h_{tx}*h_{I,lpf\_tx}*h_{I,dup}]+j\text{Im}[s_{tx}(t)*h_{tx}*h_{Q,lpf\_tx}*h_{Q,dup}]$$

Let $S_{tx-rx}$ be the duplexer isolation from the TX path to RX path, and $S_{tx}(\omega)$ be the duplexer attenuation at the RX port as a function of frequency. Then, the aggregate signal at the LNA input (e.g. at the input of LNA 710 in FIG. 5) may be expressed as:

$$w(t)=\frac{1}{2}\begin{bmatrix} \sqrt{P_{rx}}\,(s_{rx}(t)e^{j2\pi(f_{rx})t}) + \sqrt{P_{tx}S_{tx-rx}} \\ (z(t)e^{j2\pi(f_{rx}-\Delta F)t} + z^*(t)e^{-j2\pi(f_{rx}-\Delta F)t}) + \sqrt{P_{cw}S_{tx}} \\ (e^{j2\pi(f_{rx}-2\Delta F)t} + e^{-j2\pi(f_{rx}-2\Delta F)t}) \end{bmatrix}$$

The signal model for the blocker signals may be modeled as follows. Considering the nonlinear model:

$$y(t)=\alpha_1 \cdot w(t)+\alpha_2 \cdot w(t)^2+\alpha_3 \cdot w(t)^3,$$

Let $w_1(t), w_2(t)$ denote the TX leakage modulated signal at frequency $\omega_1=\omega_{tx}$ and CW tone at frequency $\omega_2=\omega_{tx}-\Delta\omega$. Let $z(t), v(t)$ denote the complex envelopes. The sum signal $w(t)$ may be written in terms of the complex envelope:

$$w(t) = w_1(t) + w_2(t) = \frac{1}{2}[z(t)e^{j\omega_1 t} + z^*(t)e^{-j\omega_1 t} + v(t)e^{j\omega_2 t} + v^*(t)e^{-j\omega_2 t}].$$

Focusing on the third nonlinearity term $w(t)^3$, the following may be observed:

$$w(t)^3 = \frac{1}{8}\begin{bmatrix} z(t)^2 e^{j2\omega_1 t} + z^*(t)z^*(t)e^{-2j\omega_1 t} + v(t)v(t)e^{j2\omega_2 t} + v^*(t)v^*(t)e^{-2j\omega_2 t} + \\ z(t)^2 e^{j2\omega_2 t} + +2z(t)z^*(t) + 2v(t)v^*(t) + 2z(t)v(t)e^{j(\omega_1+\omega_2)t} + \\ 2z(t)v^*(t)e^{j(\omega_1-\omega_2)t} + 2z^*(t)v(t)e^{j(\omega_2-\omega_1)t} + 2z^*(t)v^*(t)e^{-j(\omega_2+\omega_1)t} \end{bmatrix}$$

$$[z(t)e^{j\omega_1 t} + z^*(t)e^{-j\omega_1 t} + v(t)e^{j\omega_2 t} + v^*(t)e^{-j\omega_2 t}]$$

What is of interest is the intermodulation products that will fall onto the Rx band $\omega_{rx}=\omega_{tx}+\Delta\omega$. Since $\omega_1=\omega_{tx}$, $\omega_2=\omega_{tx}-\Delta\omega$, of interest is the intermodulation products $2\omega_1-\omega_2=\omega_{rx}$. It may be observed that the IM3 products at frequency $2\omega_1-\omega_2=\omega_{rx}$ are:

$$\frac{3}{8}z(t)z(t)v^*(t)e^{j(2\omega_1-\omega_2)} + \frac{3}{8}z^*(t)z^*(t)v(t)e^{j(-2\omega_1+\omega_2)}.$$

Since $z(t)$ denotes the TX leakage (modulated signal) and $v(t)$ denotes the CW blocker, let:

$$z(t)=I_{tx}+jQ_{tx}=a_I+ja_Q, \text{ and } v(t)=e^{j\Phi}=\beta_I+j\beta_Q.$$

Therefore, the IM3 products are proportional to:

$$IM_{3I} \propto a_I^2 \cos(\phi)+2a_I a_Q \sin(\phi)-a_Q^2 \cos(\phi), \text{ and}$$

$$IM_{3Q} \propto -a_I^2 \sin(\phi)+2a_I a_Q \cos(\phi)-a_Q^2 \sin(\phi).$$

Figure 9:
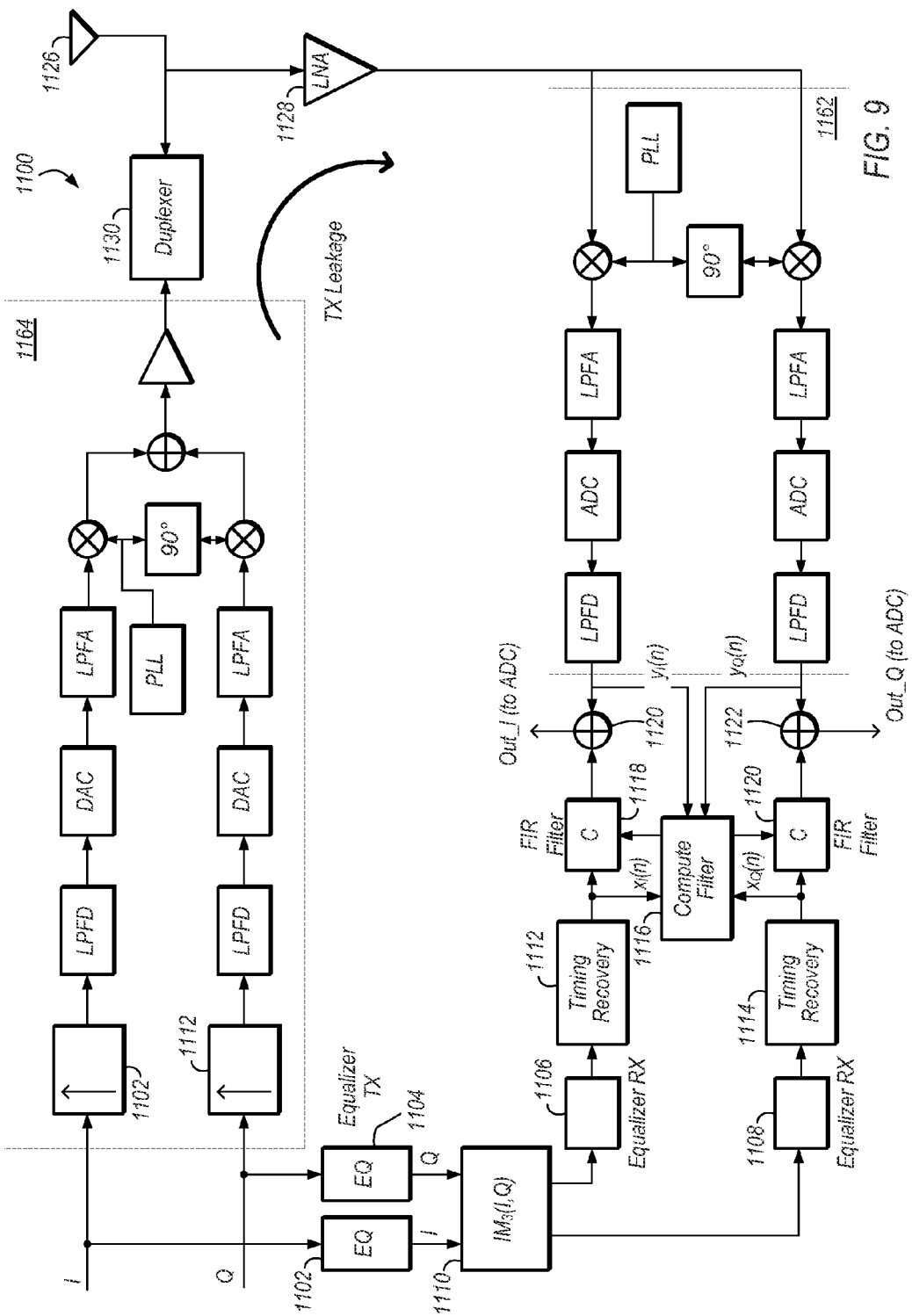
FIG. 9 shows a control diagram illustrating one embodiment of a transceiver with third-order intermodulation distortion cancellation.

FIG. 9—Transceiver System with IM3 Cancellation

Based at least one the above description and modeling, various embodiments of an IM3 cancellation architecture may be devised, whereby the third-order intermodulation distortion (IM3) products are cancelled in the digital domain. The basic building blocks of one embodiment of a novel transceiver 1100 featuring IM3 cancellation architecture in the digital domain are shown in FIG. 9. It should be noted that the representation provided in FIG. 9 is not meant to be complete, and for the sake of clarity, only components of interest in describing the operation of the IM3 cancellation have been included. Furthermore, various portions of transceiver 1100 are similar to corresponding portions of the transceiver 700 shown in FIG. 5. For example, TX path 1164 corresponds to similar TX path 764, with the corresponding elements within TX path 1164 labeled accordingly. Similarly, RX path 1164 corresponds to similar RX path 764, with the corresponding elements within RX path 1162 labeled accordingly.

As seen in FIG. 9, transceiver 1100 incorporates a compensation path used to cancel IM3 that may be present in the baseband signal derived from the RX signal received from antenna 1126 via LNA 1128 at RX path 1162. The compensation path includes a pair of TX equalizers 1102 and 1104, a replica generating function 1110, a pair of RX equalizers 1106 and 1108, timing recovery blocks 1112 and 1114, finite impulse response (FIR) filters 1118 and 1120, compute filter 1116, and summing nodes 1120 and 1122. TX equalizers 1102 and 1104 are used to compensate for the frequency selectivity introduced by the digital TX filters (LPFD) and analog TX filters (LPFA) in the corresponding I and Q paths of TX path 1164, as well as the frequency selectivity introduced in duplexer transmit filter (TF in 1130). RX equalizers 1106 and 1108 are used to compensate for the frequency selectivity introduced by the digital RX filters (LPFD) and analog RX filters (LPFA) in the respective I and Q paths of RX path 1162. The frequency selectivity may be identified by calibration methods. FIR filters 1118 and 1120 are used to accommodate for any time varying analog transfer function characteristics. A function $IM_3(I,Q)$ 1110 (implementing the $IM_{3I}$ and $IM_{3Q}$ functions provided above) may be used to provide/generate a replica signal representative of a third-order distortion signal that is present in the baseband signal (derived from the RX signal) due to intermodulation of the TX leakage signal with the CW blockers (as previously described). Timing recovery elements 1112 and 1114 are used to account for at least the propagation delays of the RX signal(s) through the RX path 1162. Programmable FIR filters 1118 and 1120 are used to generate compensation signals for the I and Q component signals, to cancel the IM3 in the RX I signal and RX Q signal, respectively. The coefficients of the FIR filters 1118 and 1120 are determined by either batch processing based on signal statistics, and/or LMS (least mean squares) adaptation in compute filter block 1116. The calculated coefficients are provided to FIR filters 1118 and 1120 to enable FIR filters 1118 and 1120 to generate accurate representations of the noise that can then be subtracted from the RX signals (RX I and RX Q, respectively).

For example, in one set of embodiments, batch processing based on signal statistics collected during operation may be used to determine the filter coefficients for FIR filters 1118 and 1120. Assuming that the filter coefficients (with five taps) are $c=[c1, c2, c3, c4, c5]^T$, the following model may be introduced:

$$\begin{bmatrix} y_n \\ y_{n-1} \\ \vdots \\ \vdots \\ \vdots \\ y_{n-K+1} \end{bmatrix} = \begin{bmatrix} x_{n-2} & x_{n-1} & x_n & x_{n+1} & x_{n+2} \\ x_{n-3} & x_{n-2} & x_{n-1} & x_n & x_{n+1} \\ \vdots & & & & \\ \vdots & & & & \\ \vdots & & & & \\ x_{n-N-1} & x_{n-N} & x_{n-N+1} & x_{n-N+2} & x_{n-N+3} \end{bmatrix} \begin{bmatrix} c1 \\ c2 \\ c3 \\ c4 \\ c5 \end{bmatrix}$$

Figure 10:
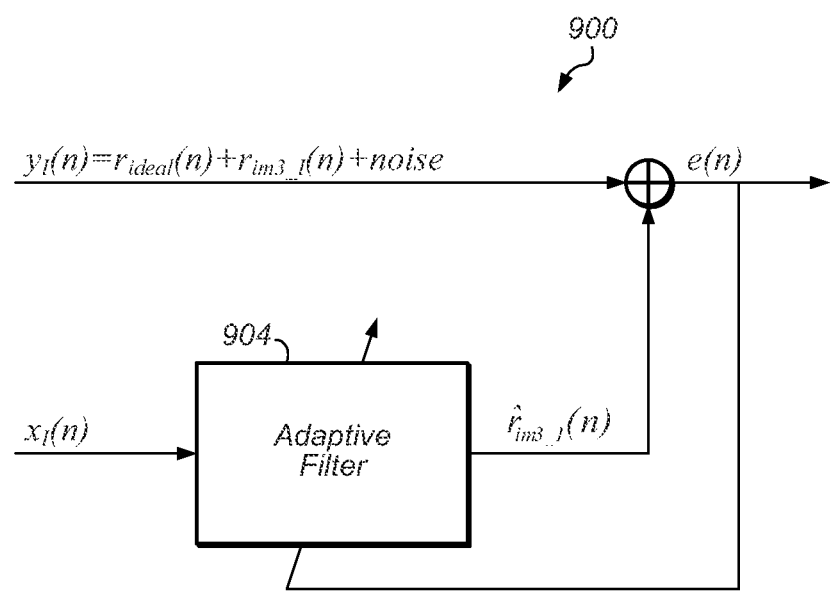
FIG. 10 shows a control diagram illustrating the use of least mean square adaptation in determining the coefficients of an adaptive filter used to remove the third-order intermodulation distortion noise from the receive signal.

The models may be denoted as $Y_n = X_n * c$. The least squares (LS) solution may then be given by $c = (X_n^T X_n)^{-1} X_n^T Y_n$. The solution may be updated with a Kalman filter. In another example, an LMS adaption may be used to determine the filter coefficients for FIR filters 1118 and 1120. As previously noted, the actual RX signal (received at RX path 1162, for example) includes the desired RX signal plus the IM3 distortion and noise. The replica signal $x_f(n)$ is correlated with $r_{im3\_I}(n)$ and uncorrelated with the desired RX signal $R_{ideal}(n)$. Minimizing $E[|e(n)|^2]$ is equivalent to minimizing $E[|r_{im3\_I} - \hat{r}_{im3\_I}(n)|^2]$. The adaptive filter may therefore be designed to remove the part of e(n) than can be estimated from $X_f(n)$, which is the $r_{im3\_I}(n)$ portion of the RX signal. One embodiment of an LMS adaptation based on the expressions given above is shown in FIG. 10. $y_f(n)$ represents the actual RX signal, which includes the desired, distortion and noise-free signal $r_{ideal}(n)$, distortion component $r_{im3\_I}$, and noise. It should be noted that for the sake of simplicity, the expressions are shown for the I component only, but similar expressions may be given for the Q component $y_Q(n)$ as well. The replica signal is provided to the FIR filter 904, which may represent FIR filter 1180 and/or 1120 from FIG. 9, which may attempt to remove the portion of the actual received signal that can be estimated from $X_f(n)$, that is, the $r_{im3\_I}(n)$.

Figure 11:
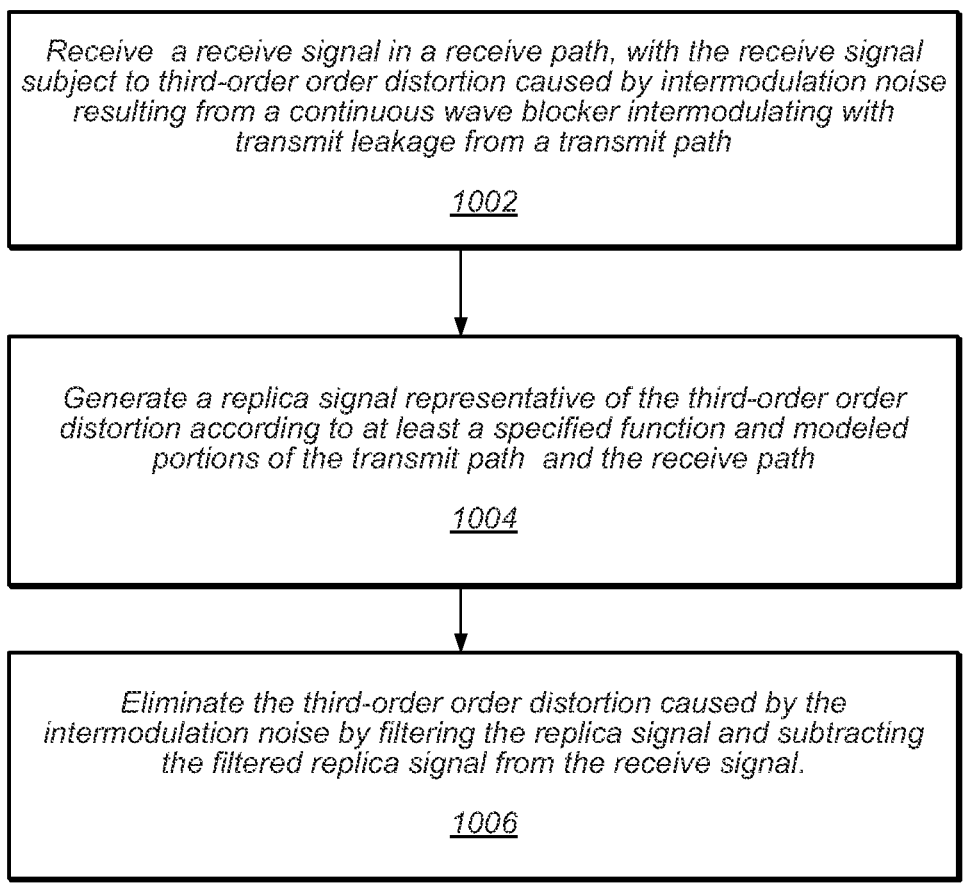
FIG. 11 shows a flow diagram of one embodiment of a method for canceling third-order intermodulation noise in a receive signal.

FIG. 11 shows a flow diagram of one embodiment of a method for canceling third-order intermodulation noise in a receive signal. The receive signal may be a baseband signal derived from a received RF signal (RX signal). Accordingly, a receive signal may be received in a receive path, with the receive signal subject to third-order order distortion caused by intermodulation noise resulting from a continuous wave blocker intermodulating with transmit leakage from a transmit path (1002). The method may further include generating a replica signal representative of the third-order order distortion according to at least a specified function (which may be derived based on non-linear signal models) and modeled portions of the transmit path and the receive path (1004). Finally, the method may include eliminating the third-order order distortion caused by the intermodulation noise by filtering the replica signal and subtracting the filtered replica signal from the receive signal (1006).

Embodiments of the present invention may be realized in any of various forms. For example, in some embodiments, the present invention may be realized as digital logic, a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A transceiver device comprising:
    a transmit path configured to generate a modulated transmit signal based on a baseband signal;
    a receive path configured to receive a receive signal, wherein the receive signal is subject to third-order distortion caused by intermodulation noise resulting from a continuous wave blocker intermodulating with transmit leakage from the transmit path; and
    a compensation path configured to:
        model portions of the transmit path and the receive path;
        generate an adjusted baseband signal from the baseband signal by adjusting the baseband signal at least according to the modeled portions of the transmit path;
        generate a digital replica signal representative of the third-order distortion from the adjusted baseband signal by adjusting the adjusted baseband signal at least according to a specified error generating function derived based at least on non-linear signal models and duplicating the third-order distortion;
        generate an adjusted digital replica signal from the digital replica signal by adjusting the digital replica signal at least according to the modeled portions of the receive path; and
        filter the adjusted digital replica signal and subtract the filtered adjusted digital replica signal from the receive signal to eliminate the third-order distortion caused by the intermodulation noise.

2. The transceiver of claim 1, wherein the compensation path comprises programmable components configured to model specified portions of the transmit path and the receive path.

3. The transceiver of claim 1, wherein the compensation path comprises finite impulse response filters configured to filter the adjusted digital replica signal.

4. The transceiver of claim 3, wherein coefficients of the finite impulse response filters are determined based on at least one of:
   batch processing based on signal statistics; and
   least mean square adaptation.

5. The transceiver of claim 3, wherein the finite impulse response filters are used to accommodate for any time varying analog transfer characteristics.

6. The transceiver of claim 1, wherein the compensation path comprises at least one of:
   a transmit equalizer configured to compensate for frequency selectivity introduced in the transmit path by at least one of: one or more digital transmit filters, one or more analog transmit filters, and a duplexer transmit function; and
   a receive equalizer configured to compensate for frequency selectivity introduced in the receive path by at least one of: one or more digital receive filters and one or more analog receive filters.

7. The transceiver of claim 6, wherein the frequency selectivity introduced in the transmit path and the frequency selectivity introduced in the receive path are both identified through calibration methods.

8. A method for eliminating third-order intermodulation distortion in a signal, the method comprising:
   receiving a receive signal in a receive path, wherein the receive signal is subject to third-order order distortion caused by intermodulation noise resulting from a continuous wave blocker intermodulating with transmit leakage from a transmit path, wherein the transmit path is configured to generate a modulated transmit signal based on a baseband signal;
   generating an adjusted baseband signal from the baseband signal, comprising adjusting the baseband signal at least according to modeled portions of the transmit path;
   generating a digital replica signal representative of the third-order distortion from the adjusted baseband signal, comprising adjusting the adjusted baseband signal at least according to a specified error-generating function derived based at least on non-linear signal models and duplicating the third-order distortion;
   generating an adjusted digital replica signal from the digital replica signal, comprising adjusting the digital replica signal at least according to modeled portions of the receive path;
   eliminating the third-order distortion caused by the intermodulation noise, comprising filtering the adjusted digital replica signal and subtracting the filtered adjusted digital replica signal from the receive signal.

9. The method of claim 8, further comprising establishing the modeled portions of the transmit path and the receive path, comprising programming one or more components in a compensation path coupled between the transmit path and the receive path.

10. The method of claim 8, wherein the filtering of the adjusted digital replica signal is performed by finite impulse response filters.

11. The method of claim 10, further comprising determining coefficients of the finite impulse response filters according to at least one of:
   batch processing based on signal statistics; and
   least mean square adaptation.

12. The method of claim 8, wherein the filtering of the adjusted digital replica signal comprises accommodating for any time varying analog transfer characteristics.

13. The method of claim 8, further comprising performing at least one of:
   compensating for frequency selectivity introduced in the transmit path by at least one of: one or more digital transmit filters, one or more analog transmit filters, and a duplexer transmit function;
   compensating for frequency selectivity introduced in the receive path by at least one of: one or more digital receive filters and one or more analog receive filters.

14. The method of claim 13, further comprising identifying, through calibration methods, at least one of:
   the frequency selectivity introduced in the transmit path; and
   the frequency selectivity introduced in the receive path.

15. A non-volatile memory device configured to store instructions executable by a processing device to cause a communication device to:
   receive a radio frequency (RF) signal;
   derive a baseband signal from the received RF signal, wherein the derived baseband signal is affected by third-order distortion caused by intermodulation noise resulting from a continuous wave blocker intermodulating with transmit leakage;
   generate an adjusted input signal by adjusting an input signal at least according to models of specific transmitter components of the communication device, wherein the input signal is provided to the specific transmitter components of the communication device;
   generate a digital replica signal representative of the third-order distortion by adjusting the adjusted input signal at least according to a specified error generating function derived based at least on non-linear signal models and duplicating the third-order distortion;
   generate an adjusted digital replica signal by adjusting the digital replica signal at least according to models of specific receiver components of the communication device; and
   filter the adjusted digital replica signal and subtract the filtered adjusted digital replica signal from the derived baseband signal to eliminate the third-order distortion caused by the intermodulation noise.

16. The non-volatile memory device of claim 15, wherein the instructions are further executable by the processing device to cause the communication device to:
   compensate for frequency selectivity introduced in at least a portion of the transceiver components of the communication device.

17. The non-volatile memory device of claim 16, wherein the frequency selectivity is introduced by at least one of:
   one or more digital transmit filters in a transmit path comprised in the at least a portion of the transceiver components;
   one or more analog transmit filters in the transmit path;
   a duplexer transmit function in the transmit path;
   one or more digital receive filters in a receive path comprised in the at least a portion of the transceiver components; and
   one or more analog receive filters in the receive path.

18. The non-volatile memory device of claim 15, wherein the specified function is based on a nonlinear model of the continuous wave blocker.

19. The non-volatile memory device of claim 15, wherein the adjusted digital replica signal is correlated with the third-order distortion affecting the derived baseband signal, and is uncorrelated with a desired portion of the derived baseband signal.

20. The non-volatile memory device of claim 15, wherein the instructions are further executable by the processing device to cause the communication device to:
  attempt to remove from the derived baseband signal a portion of the derived baseband signal that is estimated from the adjusted digital replica signal.

* * * * *